United States Patent
Koernle et al.

(10) Patent No.: US 6,717,416 B2
(45) Date of Patent: Apr. 6, 2004

(54) CIRCUIT CONFIGURATION FOR THE VOLTAGE SUPPLY OF A TWO-WIRE SENSOR

(75) Inventors: Ralf Koernle, Zell a.H. (DE); Juergen Motzer, Gengenbach (DE); Albert Wöhrle, Aichhalden (DE)

(73) Assignee: VEGA Grieshaber KG, Wolfach (DE)

( * ) Notice: Subject to any disclaimer, the term of this patent is extended or adjusted under 35 U.S.C. 154(b) by 0 days.

(21) Appl. No.: 09/987,742

(22) Filed: Nov. 15, 2001

(65) Prior Publication Data

US 2003/0052705 A1 Mar. 20, 2003

(30) Foreign Application Priority Data

Sep. 14, 2001 (DE) ......................... 101 45 520

(51) Int. Cl.⁷ ............................................. H01H 31/02
(52) U.S. Cl. ..................................................... 324/537
(58) Field of Search ................. 324/133, 537, 324/538, 555; 361/86, 87, 91.1, 179, 181; 323/324, 326, 385

(56) References Cited

U.S. PATENT DOCUMENTS

| | | | | |
|---|---|---|---|---|
| 5,081,411 A | * | 1/1992 | Walker | 323/326 |
| 5,142,235 A | * | 8/1992 | Matsumoto et al. | 324/537 |
| 5,623,172 A | * | 4/1997 | Zaretsky | 340/541 |
| 5,754,421 A | * | 5/1998 | Nystrom | 363/155 |
| 5,786,644 A | * | 7/1998 | Zaretsky | 340/565 |
| 5,790,046 A | * | 8/1998 | Blossfeld | 324/207.13 |
| 6,118,260 A | * | 9/2000 | Kirkpatrick, II et al. | 323/312 |
| 6,437,581 B1 | * | 8/2002 | Blossfeld | 324/537 |
| 2002/0153885 A1 | * | 10/2002 | Blossfeld | 324/252 |
| 2003/0052657 A1 | * | 3/2003 | Koernle et al. | 323/282 |

FOREIGN PATENT DOCUMENTS

| | | | | |
|---|---|---|---|---|
| DE | 36 15 463 | | 11/1987 | |
| DE | 39 04 363 | | 8/1990 | |
| DE | 691 29 189 | | 4/1992 | |
| DE | 196 22 973 | | 5/1998 | |
| DE | 199 10 409 | | 11/1999 | |
| JP | 06036180 A | * | 2/1994 | 340/870.01 |
| JP | 08088554 A | * | 4/1996 | H03K/17/945 |
| JP | 2003021115 A | * | 1/2003 | G01R/33/02 |

* cited by examiner

Primary Examiner—David A. Zarneke
Assistant Examiner—Jermele M. Hollington
(74) Attorney, Agent, or Firm—Nath & Associates PLLC; Marvin C. Berkowitz

(57) ABSTRACT

A two-wire sensor (S) is connected to a pole via a first connection line (V1) in which a voltage longitudinal controller (SR) and a current-limiting resistor (R1) are positioned, and via a second connection line (V2) to which the other pole of a power supply source is connected. The output of the voltage longitudinal controller (SR) is connected to the second connection line (V2) via a first limiting diode (D1) and a second limiting diode (D2) which preferably is installed opposite the first connected diode. The joint node of the two limiting diodes (D1, D2) is connected to the control input of the voltage longitudinal controller (SR).

5 Claims, 2 Drawing Sheets

CIRCUIT CONFIGURATION FOR THE VOLTAGE SUPPLY OF A TWO-WIRE SENSOR

FIELD OF THE INVENTION

This invention relates to a circuit configuration for voltage supply of a two-wire sensor which is connected to a supply voltage source via a first connection line, in which a voltage longitudinal controller is positioned, and via a second connection line, in which the controller output is connected to the second connection line via a series circuit comprising at least two oppositely poled limiting diodes, and in which a current-limiting resistor is positioned in one of the two connection lines between the two-wire sensor and the series circuit comprising the limiting diodes.

BACKGROUND OF THE INVENTION

A two-wire sensor is developed from a sensor element which measures a physical dimension, such as temperature, pressure or field strength of a magnetic field, as well as electronic components for processing signals supplied by the sensor element. Both the power supply and the conduction of the measured and processed measuring signals is effected only via two lines from which the name two-wire sensor is derived. Therefore, a two-wire sensor only has two connections which simultaneously serve to supply power and to conduct the measured and processed measuring signals.

Two-wire sensors, which are used in explosion-endangered areas, are equipped with a circuit configuration for current and voltage limiting—a so-called electrical barrier—to prevent explosions. To protect against overvoltages which might trigger potential ignition, the two connection lines are interconnected via at least one limiting diode. To protect the sensor against excessive currents which would cause the sensor to overheat, a series resistor is installed in the line after the limiting diode. To protect the limiting diode against excessive high voltages, a voltage longitudinal controller, for example, is fit in the connection line, the output voltage of which during operation must always be smaller than the limiting voltage of the limiting diode.

Two-wire sensors, which are fitted with a so-called HART® interface, however, require a so-called HART® resistor of a prescribed value in one of the two connection lines leading from the supply voltage to the two-wire sensor. With a severely loaded two-wire sensor, this additional longitudinal resistor in one of the two connection lines may result in the supply voltage no longer being sufficient for flawless operation of the two-wire sensor.

SUMMARY OF THE INVENTION

Therefore, it is the object of the present invention to design a circuit arrangement for a voltage supply of a two-wire sensor such that, on the one hand, overvoltages and overcurrents are avoided with certainty, while, on the other hand, a sufficient supply voltage for flawless operation is always provided.

The foregoing object is achieved in the present invention by means of the features specified in claim 1, in that the joint connection point of the two limiting diodes is connected to the control input of the voltage longitudinal controller.

The inventive measure, obtaining the regulating quantity for the voltage longitudinal controller from a pick-off of the series circuit of the limiting diodes acting as a voltage divider, has the advantage that the limiting voltage can be selected considerably smaller than with prior art electrical barriers. Because of the low limiting voltage, the longitudinal resistors, above all, the current-limiting resistor, in the connection lines from the supply voltage to the two-wire sensor can also be dimensioned smaller, so that the voltage loss—i.e., the voltage drop at the longitudinal resistors—caused by the supply current for the two-wire sensor is also reduced. Because of low voltage losses, the inventive circuit configuration, therefore, generates a higher supply voltage than known electric barriers for the two-wire sensor, in spite of equal supply voltages.

The invention is explained in detail by means of the figures.

DETAILED DESCRIPTION OF THE INVENTION

Figure 1:
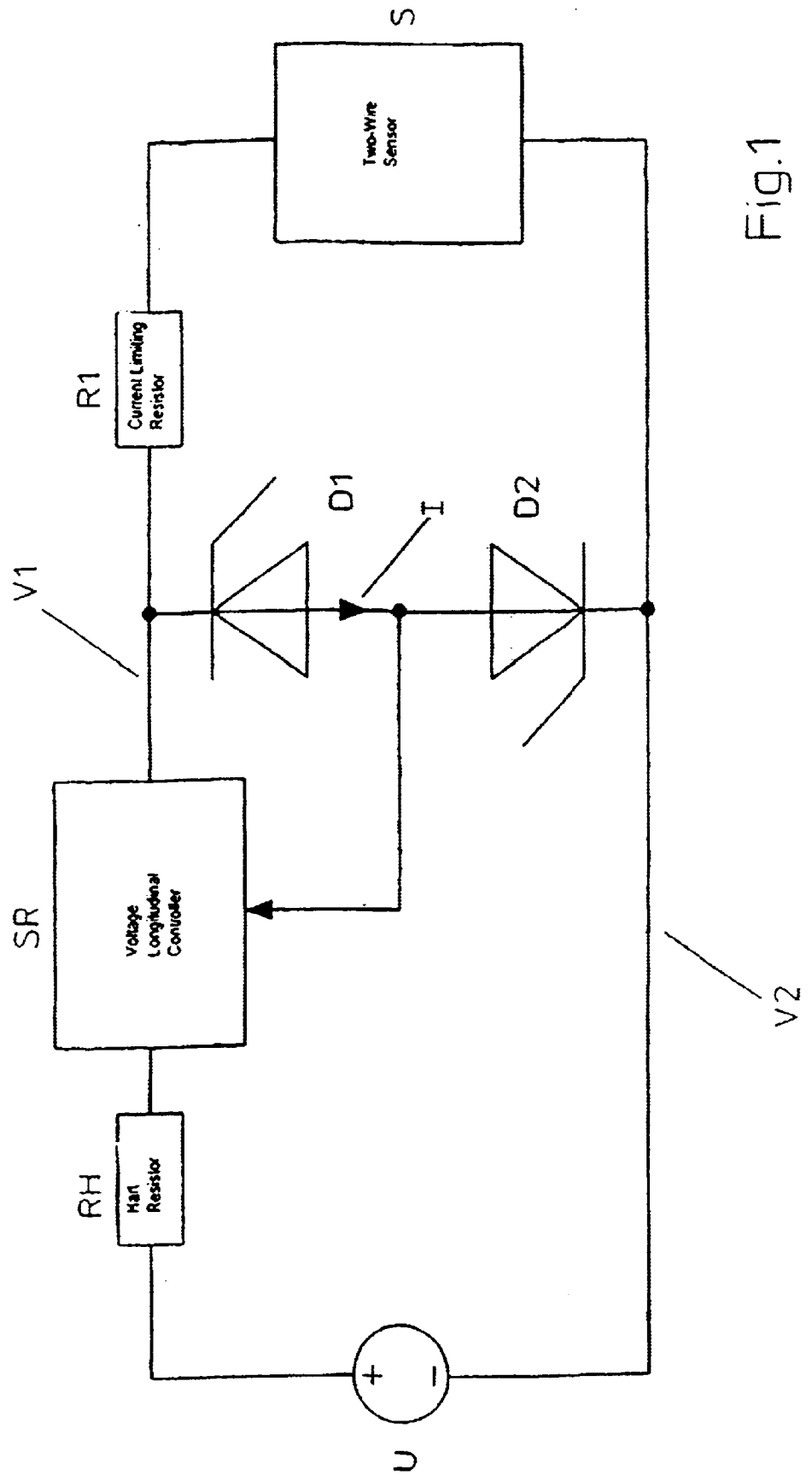
FIG. 1 shows a block diagram of a first embodiment of the invention.

A block diagram of a first embodiment of the invention is shown in FIG. 1.

One pole of a supply voltage source U is connected via a HART® resistor RH to the input of a voltage longitudinal controller SR, the voltage output of which is connected via a current-limiting resistor R1 to the input of a two-wire sensor S. The HART® resistor, the voltage longitudinal controller SR and the current-limiting resistor R1 are positioned in a first connection line V1, while the second pole of the supply voltage source U is connected to the other input of the two-wire sensor S via a second connection line V2. The controller output of the voltage longitudinal controller SR is connected to the second connection line V2 via a series circuit comprising two limiting diodes D1 and D2. The joint node of the two limiting diodes D1 and D2 is connected to the control input of the voltage longitudinal controller SR. The two limiting diodes D1 and D2 may be identically or oppositely poled.

If the voltage at the output of the voltage longitudinal controller SR exceeds the limiting voltage of the limiting diodes, a current flows through the two limiting diodes D1 and D2, so that the potential at the control input of the voltage longitudinal controller SR is pulled onto the potential an the other pole of the supply voltage source U, which, for example, is grounded. The voltage longitudinal controller SR controls the voltage at its output and thus to a lower value, as a result of which the current through the two diodes D1 and D2 again drops to a residual current I which, however, is negligibly small.

Figure 2:
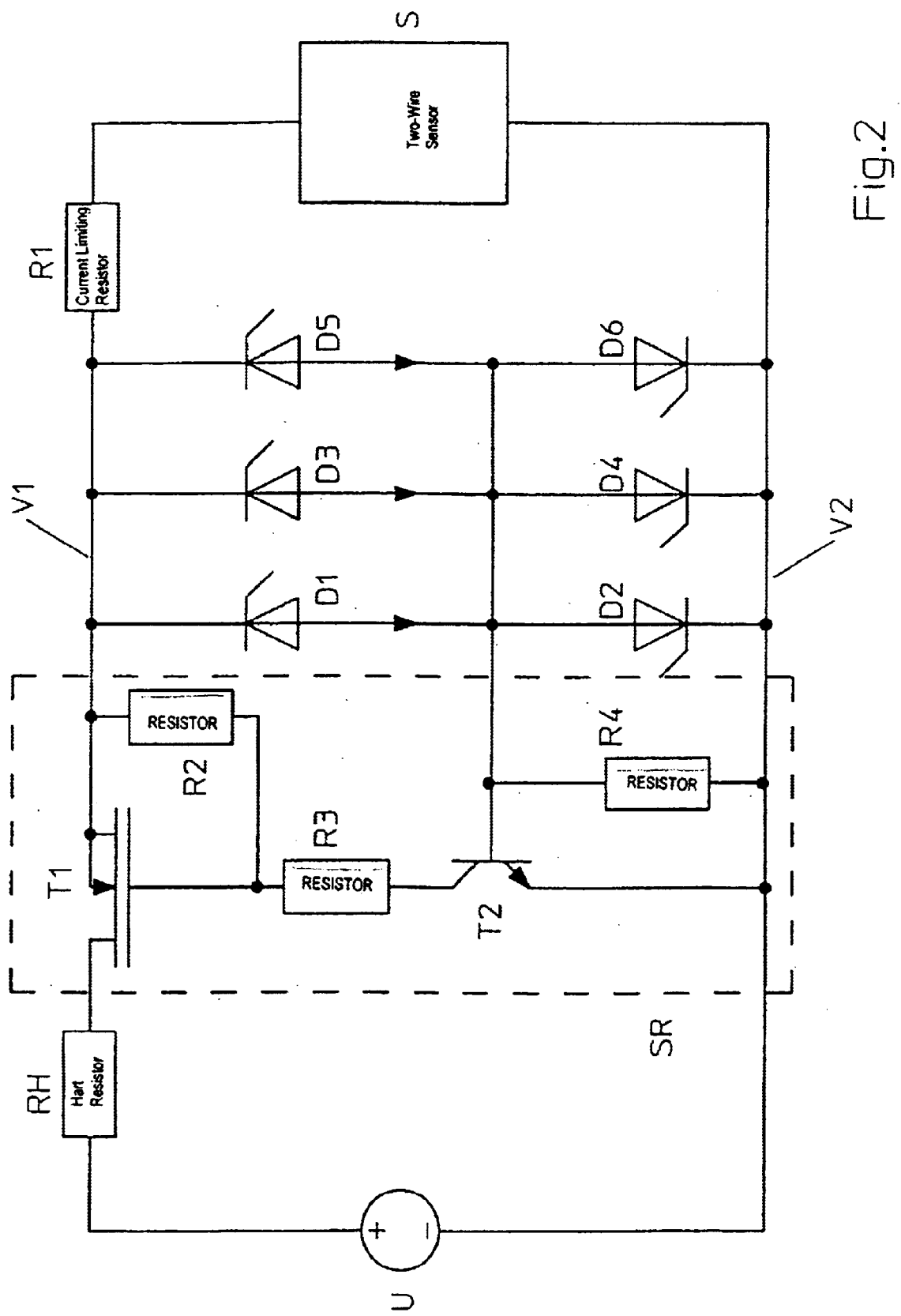
FIG. 2 shows a block diagram of a second embodiment of the invention.

A block diagram of a circuit configuration according to a second embodiment of the invention is shown in FIG. 2.

One pole of the supply voltage source U is connected to one input of a two-wire sensor S via a series circuit comprising a HART® resistor RH, the drain source path of a field effect transistor T1 and via a current-limiting resistor R1. The HART® resistor RH, the drain source path of the field effect transistor T1, and the current-limiting resistor R1 are positioned in a first connection line V1. The other pole of the supply voltage source U is connected to the other input of the two-wire sensor S via a second connection line V2. The source electrode of the field effect transistor T1 is connected to the second connection line V2 via a series circuit comprising two limiting diodes D1 and D2. Parallel to said series circuit, two additional series circuits of similar structure may be provided, each with two additional limiting diodes D3, D4, D5 and D6. The gate electrode of the field effect transistor T1 is connected to the source electrode via a resistor R2. Furthermore, the gate electrode of the field effect transistor T1 is connected via a resistor R3 with the collector of a transistor T2, the emitter of which is connected to the second connection line V2.

The points of connection of the limiting diodes D1 through D6 form a joint node which is connected to the base of the transistor T2. The series-connected limiting diodes D1 and D2, D3 and D4, as well as D5 and D6, may be identically or oppositely poled.

The function of the second embodiment shown in FIG. 2 corresponds to the first embodiment of FIG. 1. The field effect transistor T1 and the transistor T2 represent the voltage longitudinal controller SR. So long as no overvoltage occurs at the source electrode of the field effect transistor T1, the limiting diodes D1 through D6 block. As mentioned in the first embodiment, only the residual current I flows which, however, is negligibly small. If the voltage between the source electrode of the field effect transistor T1 and the second connection line V2 exceeds the limiting voltage, the limiting diodes D1 through D6 become conductive, so that a current flows through the first connection line V1 to the second connection line V2. Because the base of the transistor T2 is connected to the joint node of the limiting diodes D1 through D6, the transistor T2 becomes conductive, so that the gate electrode of the field effect transistor T1 is pulled onto the potential at the other pole of the supply voltage source U. As the field effect transistor blocks for this reason, the voltage between its source electrode and the second connection line V2 again drops below the value of the limiting voltage. Apart from the negligibly small residual current I, the limiting diodes D1 through D6 again become currentless, so that the transistor T2 again blocks, while the field effect transistor T1 again becomes conductive. By this means, one is able to control the supply voltage for the two-wire sensor S.

As mentioned above, the invention permits a much narrower limiting voltage than prior art electrical barriers, which allows a smaller current-limiting resistor. Because of the smaller current-limiting resistor R1, the inventive voltage losses are lower than with prior art electrical barriers. A comparison between the invention and a prior art barrier indicates that, with similar supply voltage sources, the invention provides for a greater voltage for the two-wire sensor. On the other hand, with the invention with equal supply currents, a lower supply voltage suffices for the two-wire sensor.

List of Reference Symbols

D1–D6 limiting diode
I residual current
RH HART® resistor
R1 current-limiting resistor
R2–R4 resistor
S two-wire sensor
SR voltage longitudinal controller
T1 field effect transistor
T2 transistor
U supply voltage source
V1 first connection line
V2 second connection line

What is claimed is:

1. Circuit configuration for voltage supply of a two-wire sensor (S) which is connected to a supply voltage source (U) via a first connection line (V1) in which a voltage longitudinal controller (SR) is positioned, and a second connection line (V2), wherein a controller output is connected to the second connection line (V2) via at least one limiting diode (D1), and wherein a current-limiting resistor (R1) is positioned in one of the two connection lines (V1) between the two-wire sensor (S) and the limiting diode (D1), characterized in that:

the controller output is connected to the second connection line (V2) via a series circuit comprising two limiting diodes (D1, D2), and that a joint node of the two limiting diodes (D1, D2) is connected to a control input of the voltage longitudinal controller (SR).

2. Circuit configuration as defined in claim 1, characterized in that a HART® resistor is positioned in one of the two connection lines (V1, V2).

3. Circuit configuration as defined in claim 1, characterized in that:

voltage longitudinal controller (SR) comprises a field effect transistor (T1), a transistor (T2), and resistors (R2, R3, R4) wherein:

a terminal of the supply voltage source (U) is connected to an input of two-wire sensor (S) via a HART® resistor (RH), a drain source path of the field effect transistor (T1), and the current-limiting resistor (R1) connected serially, the other input of the two-wire sensor is connected to an other terminal of the supply voltage source (U) via the second connection line (V2), the HART® resistor (RH), the drain source path of the field effect transistor (T1) and the current-limiting resistor (R1) are positioned in the first connection line (V1), the source electrode of the field effect transistor (T1) is connected to the second connection line (V2) via a series circuit comprising a first and second limiting diode (D1, D2), a first resistor (R4) is connected in parallel to the second limiting diode (D2), one joint node of the second limiting diode (D2) and the first resistor (R4) is connected to a base of the transistor (T2), a collector of the transistor (T2) is connected to a gate electrode of the field effect transistor (T1) via a second resistor (R3), and an emitter of the transistor (T2) connected to the second connection line (V2), and the gate electrode of the field effect transistor (T1) is connected to the source electrode thereof via a third resistor (R2).

4. Circuit configuration as defined in claim 3, characterized in that at least one additional limiting diode each (D3, D4, D5, D6) is connected parallel to each limiting diode (D1, D2).

5. Circuit configuration as defined in claim 4, characterized in that the series connected limiting diodes (D1 through D6) are oppositely polarized.

* * * * *